(12) United States Patent
Hayashi et al.

(10) Patent No.: US 11,303,214 B2
(45) Date of Patent: Apr. 12, 2022

(54) POWER CONVERSION DEVICE AND POWER SUPPLY DEVICE

(71) Applicant: Kabushiki Kaisha Toshiba, Tokyo (JP)

(72) Inventors: Yusuke Hayashi, Yokohama Kanagawa (JP); Kazuto Takao, Tsukuba Ibaraki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 24 days.

(21) Appl. No.: 17/014,893

(22) Filed: Sep. 8, 2020

(65) Prior Publication Data

US 2021/0257919 A1    Aug. 19, 2021

(30) Foreign Application Priority Data

Feb. 19, 2020    (JP) .............................. JP2020-026558

(51) Int. Cl.
   *H02M 3/335*    (2006.01)
   *H02M 1/08*    (2006.01)
   *H02M 1/00*    (2006.01)

(52) U.S. Cl.
   CPC .......... *H02M 3/33569* (2013.01); *H02M 1/08* (2013.01); *H02M 1/0058* (2021.05)

(58) Field of Classification Search
   CPC ... H02M 3/33569; H02M 1/0058; H02M 1/08
   (Continued)

(56) References Cited

U.S. PATENT DOCUMENTS

| 4,677,537 A | 6/1987 | Kaisha |
| 9,065,338 B2 | 6/2015 | Toshiba |

(Continued)

FOREIGN PATENT DOCUMENTS

| CN | 102185496 A | 9/2011 |
| EP | 2 584 686 A1 | 4/2013 |

(Continued)

OTHER PUBLICATIONS

K. Sano and H. Fujita, "Voltage-Balancing Circuit Based on a Resonant Switched-Capacitor Converter for Multilevel Inverters," IEEE Transactions on Industry Applications, vol. 44, No. 6, pp. 1768-1776 (2008).

*Primary Examiner* — Yemane Mehari
(74) *Attorney, Agent, or Firm* — Finnegan, Henderson, Farabow, Garrett & Dunner L.L.P.

(57) ABSTRACT

A power conversion device includes a first switching element and a first inductor connected in series between a first terminal and a second terminal, the first inductor and a second switching element being connected in series between the second and third terminals, a switching controller that alternately turns on and off the first and second switching elements, a first capacitor connected between the first and second terminals, and a second capacitor connected between the second and third terminals. When a first full-wave rectified voltage is input, switching frequencies of the first switching element and the second switching element, an inductance of the first inductor, a capacitance of the first capacitor, and a capacitance of the second capacitor are set so that a second full-wave rectified voltage having a voltage amplitude and a phase same as the voltage amplitude and the phase of the first full-wave rectified voltage is output.

20 Claims, 16 Drawing Sheets

(58) Field of Classification Search
USPC .................................................. 363/21.01
See application file for complete search history.

(56) References Cited

U.S. PATENT DOCUMENTS

| | | | |
|---|---|---|---|
| 9,374,016 B2 | 6/2016 | Fuji | |
| 2009/0195079 A1 | 8/2009 | Barrenscheen | |
| 2013/0049712 A1* | 2/2013 | Ueno | H02M 3/1584 |
| | | | 323/234 |
| 2015/0372614 A1* | 12/2015 | Yamada | H02M 3/156 |
| | | | 363/89 |
| 2018/0294732 A1* | 10/2018 | Ye | H02M 3/33546 |

FOREIGN PATENT DOCUMENTS

| | | |
|---|---|---|
| EP | 2 738 928 A1 | 6/2014 |
| JP | S61-76069 A | 4/1986 |
| JP | 2000-37078 A | 2/2000 |
| JP | 2008-54475 A | 3/2008 |
| JP | 2010-68701 A | 3/2010 |
| JP | 2013-46470 A | 3/2013 |
| JP | 2016-27779 A | 2/2016 |
| JP | 2017-17868 A | 1/2017 |
| JP | 2017-77114 A | 4/2017 |
| WO | WO-2020051557 A1 * | 3/2020 ............. H02J 9/062 |
| WO | WO-2020096657 A1 * | 5/2020 ............. B60L 53/22 |

\* cited by examiner

| Rated I / O voltages $v_i$, $v_o$ | 48 V, 48 V | | | |
|---|---|---|---|---|
| Rated inductor current $i_L$ | 6.25 A | | | |
| Duty ratio D | 0.5 | | | |
| Turn ratio n | 1 | | | |
| Ripple rate α, β | 0.2, 0.03 | | | |
| Frequency $f_{sw}$ | 50 kHz | 100 kHz | 1 MHz | 3 MHz |
| Inductance L | 384 µH | 192 µH | 19.2 µH | 6.4 µH |
| Capacitance C | 43.4 µF | 21.7 µF | 2.17 µF | 723 nF |

FIG. 2

11:POWER SUPPLY DEVICE

POWER CONVERSION DEVICE AND POWER SUPPLY DEVICE

CROSS REFERENCE TO RELATED APPLICATIONS

This application is based upon and claims the benefit of priority from the prior Japanese Patent Application No. 2020-26558, filed on Feb. 19, 2020, the entire contents of which are incorporated herein by reference.

FIELD

One embodiment of the present invention relates to a power conversion device and a power supply device.

BACKGROUND

There has been proposed a power conversion device that performs power conversion by applying an input voltage to a multi-cell circuit in which a plurality of cell circuits such as AC-DC converters and DC-DC converters is connected in series. Output terminals of cell circuits forming the multi-cell circuit can be connected in series to generate a high DC voltage.

In this type of power conversion device, it is common to provide a slave controller that controls the output voltage and the output electric current of a cell circuit for each cell circuit, and a master controller that stabilizes the operation of all the cell circuits in the multi-cell circuit. The master controller needs to control each cell circuit in cooperation with each slave controller, thus making the control more complicated. Further, if a master controller is provided, the number of components increases and wiring is required to connect the master controller to all the cell circuits. This increases the number of wires, increases power consumption, and makes it difficult to reduce the size of the device.

When the output terminals of the above-described plurality of cell circuits are connected in parallel, the voltages of the output terminals are automatically balanced. However, when the output terminals of the plurality of cell circuits are connected in series, the voltages of the output terminals are not automatically balanced, and an unstable output voltage with different voltage amplitudes is obtained for each output terminal of each cell circuit.

BRIEF DESCRIPTION OF THE DRAWINGS

FIG. 2 illustrates characteristic values of L and C in a design example;

DETAILED DESCRIPTION

According to one embodiment, a power conversion device includes a first switching element and a first inductor connected in series between a first terminal and a second terminal, the first inductor and a second switching element being connected in series between the second terminal and a third terminal;

a switching controller that alternately turns on and off the first switching element and the second switching element at a predetermined duty ratio;

a first capacitor connected between the first terminal and the second terminal; and a second capacitor connected between the second terminal and the third terminal, wherein when a first full-wave rectified voltage is input between the first and second terminals, a switching frequency of the first switching element, a switching frequency of the second switching element, an inductance of the first inductor, a capacitance of the first capacitor, and a capacitance of the second capacitor are set in a manner that a second full-wave rectified voltage having a voltage amplitude and a phase which are identical to the voltage amplitude and the phase of the first full-wave rectified voltage is output from between the second and third terminals.

Hereinafter, embodiments of a power conversion device will be described with reference to the accompanying drawings. In the following, main constituent components of the power conversion device will be mainly described, but the power conversion device may have other constituent components or functions not illustrated or described. The following description does not exclude such constituent components or functions not illustrated or described.

First Embodiment

Figure 1:
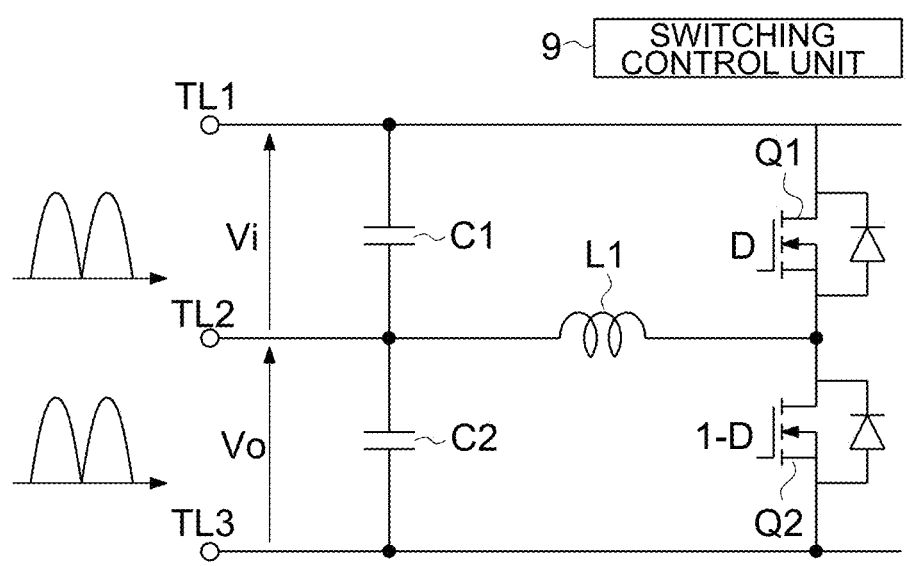
FIG. 1 is a circuit diagram of a power conversion device according to a first embodiment.

FIG. 1 is a circuit diagram of a power conversion device 1 according to a first embodiment. The power conversion device 1 of FIG. 1 includes a first switching element Q1, a second switching element Q2, a first inductor L1, a first capacitor C1, a second capacitor C2, and a switching control unit 9. The power conversion device 1 of FIG. 1 constitutes a step-up and step-down chopper circuit.

The first capacitor C1 is connected between a first terminal TL1 and a second terminal TL2. The first switching element Q1 and the first inductor L1 are connected in series between the first and second terminals TL1 and TL2. The second capacitor C2 is connected between the second terminal TL2 and a third terminal TL3. The second switching element Q2 and the first inductor L1 are connected in series between the second and third terminals TL2 and TL3.

The switching control unit 9 alternately turns on or off the first switching element Q1 and the second switching element Q2 at a predetermined duty ratio. The predetermined duty ratio is, for example, 50%.

The full-wave rectified voltage Vi is input between the first and second terminals TL1 and TL2. The full-wave rectified voltage Vo is output from between the second and third terminals TL2 and TL3.

Thus, the first and second switching elements Q1 and Q2 are cascode-connected between the first and third terminals TL1 and TL3. The first inductor L1 is connected between a connection node of the first and second switching elements Q1 and Q2 and the second terminal TL2.

The first and second switching elements Q1 and the second switching element Q2 are, for example, power transistors, MOSFETs or IGBTs. The first switching element Q1 is also called a high-side transistor, and the second switching element Q2 is also called a low-side transistor. In the following, an example in which an NMOS transistor (N-type MOSFET) is used as the first and second switching elements Q1 and Q2 is described.

When the first switching element Q1 is on and the second switching element Q2 is off in FIG. 1, an electric current passes from the first terminal TL1 to the second terminal TL2 through the drain-source of the first switching element Q1 and through the first inductor L1. When the second switching element Q2 is on and the first switching element Q1 is off, the electric current passes from the second terminal TL2 to the third terminal TL3 through the first inductor L1 and the drain-source of the second switching element Q2.

By appropriately setting the switching frequency of the first and second switching elements Q1 and Q2, the inductance of the first inductor L1, and the capacitance of the first and second capacitors C1 and C2, it is possible to equalize the voltage amplitude and phase of a full-wave rectified voltage Vi input between the first and second terminals TL1 and TL2 and the voltage amplitude and phase of the full-wave rectified voltage Vo output from between the second terminal TL2 and the third terminal TL3 at a duty ratio 50% for the first and second switching elements Q1 and Q2.

When the duty ratio of the first switching element Q1 is D, the relationship between the full-wave rectified voltage Vi input between the first and second terminals TL1 and TL2, and the full-wave rectified voltage Vo output from between the second and third terminals TL2 and TL3 is expressed by Equation (1):

$$\frac{V_o}{V_i} = \frac{D}{1-D} \quad (1)$$

The transfer characteristic of the power conversion device 1 in FIG. 1 is expressed by Equations (2) to (4). In Equations (2) to (4), the duty ratio D'=1−D of the second switching element Q2:

$$\frac{V_o}{V_i} = \frac{D}{D'} \cdot \frac{1}{1 + \frac{2\zeta}{\omega_c}s + \frac{1}{\omega_c^2}s^2} \quad (2)$$

$$\omega_c = 2\pi f_c = \frac{D'}{\sqrt{LC}} \quad (3)$$

$$\zeta = \frac{1}{2D'R}\sqrt{\frac{L}{C}} \quad (4)$$

L and C in Equations (2) to (4) are expressed by Equations (5) and (6). αI is the ripple amplitude of the electric current passing through the first inductor L1 (L in the equation), and βVo is the ripple amplitude of the voltage applied to the first capacitor C1 and the second capacitor C2 (C in the equation). FIG. 2 is a diagram illustrating characteristic values of L and C in a design example.

$$L = \frac{V_i \cdot D}{\alpha \cdot I \cdot f_{SW}} \quad (5)$$

$$C = \frac{I \cdot D}{\beta \cdot V_o \cdot f_{SW}} \quad (6)$$

The full-wave rectified voltage Vi includes a harmonic component, and it is desirable to convert the power including the harmonic component of the full-wave rectified voltage Vi without loss. In practice, for example, if power conversion up to the 10th harmonic component can be performed without loss, the voltage amplitude and phase of the input and output full-wave rectified voltages Vi and Vo can be the same.

Figure 3:
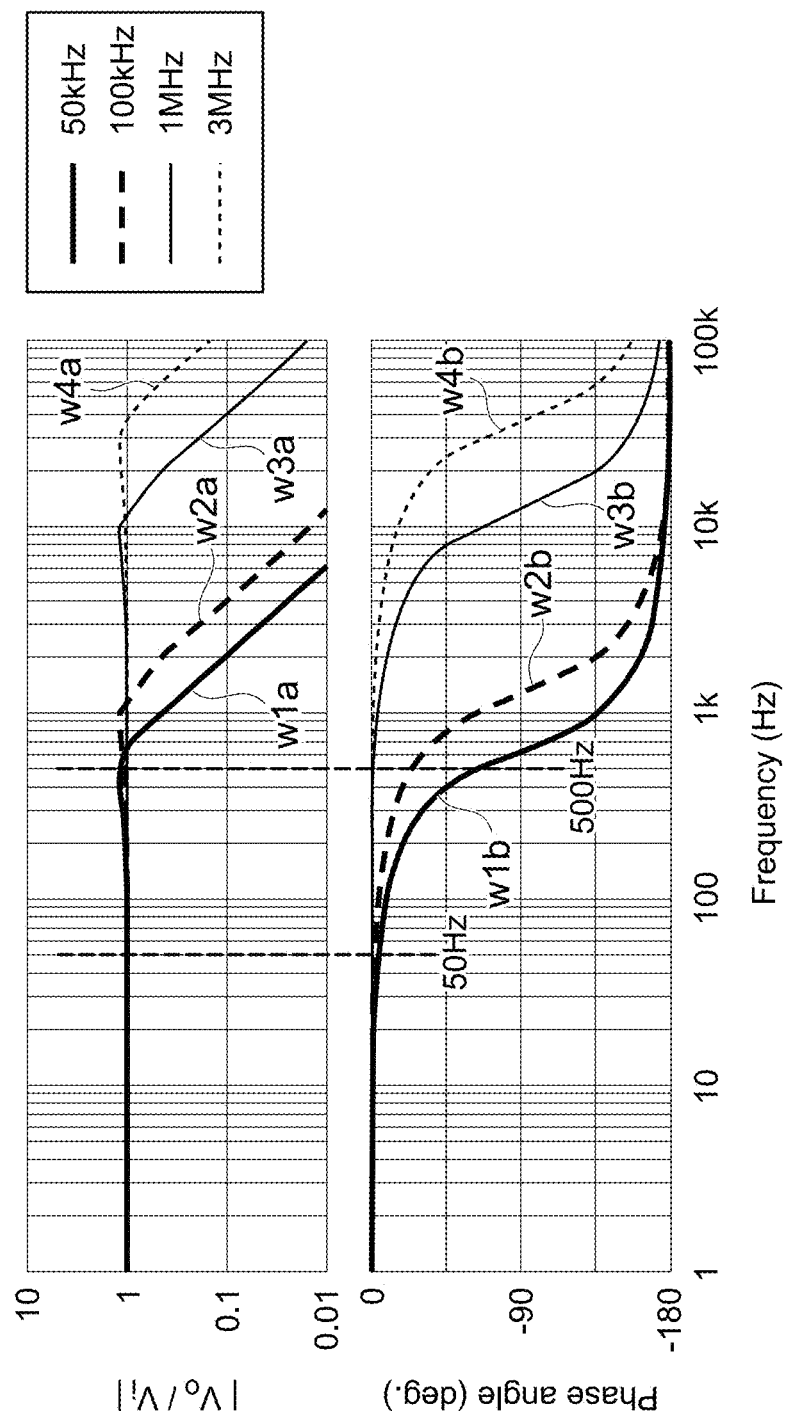
FIG. 3 illustrates frequency characteristics of the power conversion device of FIG. 1.

FIG. 3 illustrates the frequency characteristics of the power conversion device 1 of FIG. 1 when the circuit parameters are set as in FIG. 2. The upper graph of FIG. 3 illustrates the correspondence between the frequency of the input voltage Vi and the gain |Vo/Vi| which is the amplitude ratio of the input voltage Vi to the output voltage Vo. The lower graph of FIG. 3 illustrates the correspondence between the frequency of the input voltage Vi and the phase angle that is the phase difference between the input voltage Vi and the output voltage Vo.

The upper side of FIG. 3 illustrates graphs w1a, w2a, w3a, and w4a, each representing the correspondence between the frequency of the input voltage Vi and the gain |Vo/Vi| when the switching frequencies of the first and second switching elements Q1 and Q2 are 50 kHz, 100 kHz, 1 MHz, and 3 MHz. Further, the lower side of FIG. 3 illustrates graphs w1b, w2b, w3b, and w4b each representing the correspondence between the frequency and phase angle of the input voltage Vi when the switching frequencies of the first and second switching elements Q1 and Q2 are 50 kHz, 100 kHz, 1 MHz, and 3 MHz.

When the input voltage Vi has a waveform obtained by full-wave rectification of a sine wave having a frequency of 50 Hz, the frequency of the 10th harmonic component is 500 Hz. As can be seen from FIG. 3, the higher the switching frequency of the first switching element Q1 and the second switching element Q2, the more difficult the gain loss and the phase change occur even when the frequency of the input voltage Vi is high.

Figure 4:
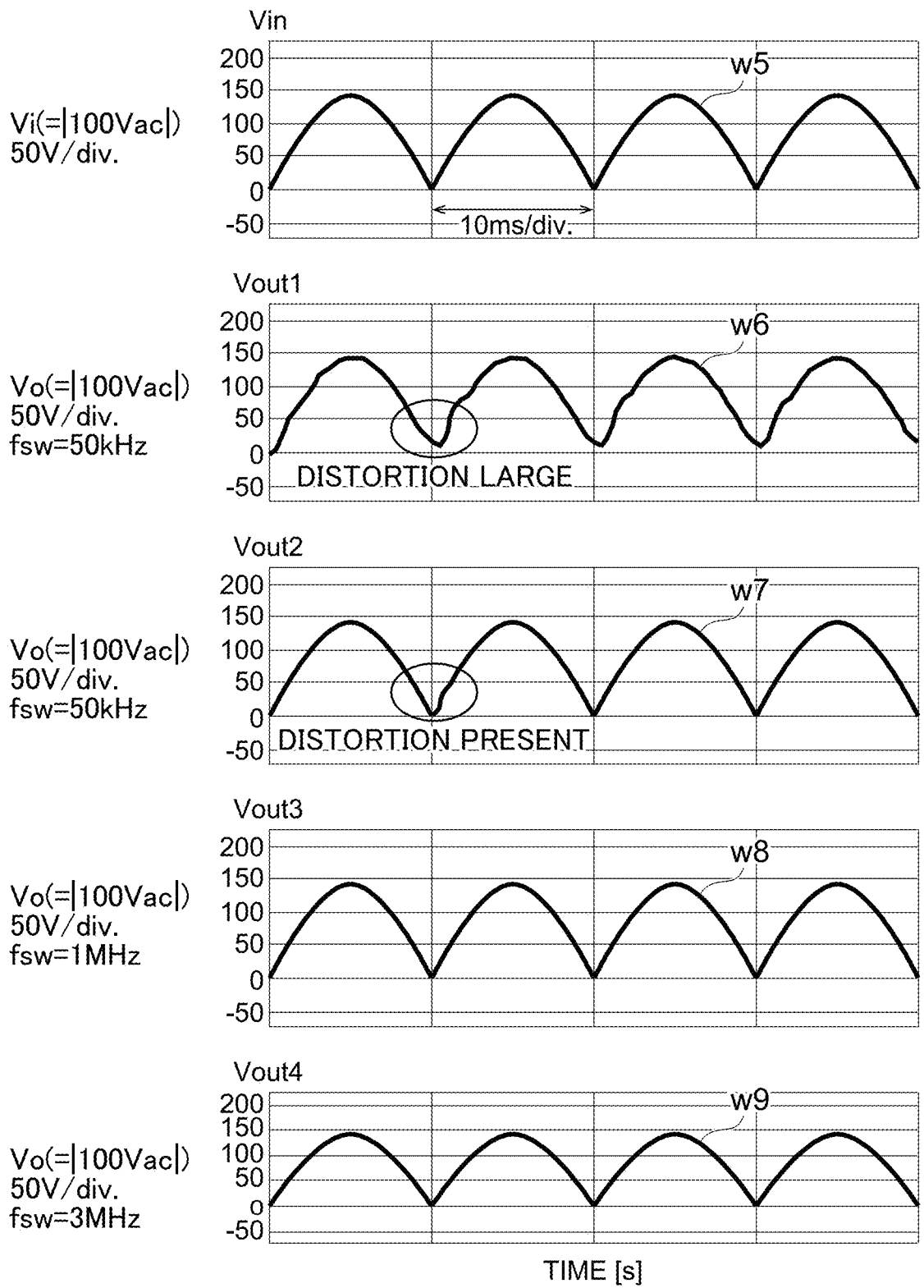
FIG. 4 illustrates the correspondence between the switching frequency and the waveform distortion of the output voltage.

FIG. 4 illustrates the correspondence between the switching frequency and the waveform distortion of the output voltage Vo. A waveform w5 in FIG. 4 is a waveform diagram of the input voltage Vi including the full-wave rectified voltage. Waveforms w6 to w9 are waveform diagrams of the output voltage Vo when the switching frequency is fsw=50 kHz, 100 kHz, 1 MHz, and 3 MHz, respectively. As can be seen from waveforms w8 and w9 in FIG. 4, when the switching frequency fsw exceeds 1 MHz, the output voltage Vo is not distorted. That is, when the switching frequency exceeds 1 MHz, the power conversion can be performed without generating the gain loss and the phase change of the tenth harmonic of the input voltage Vi.

From the above, it can be seen that in the power conversion device 1 of FIG. 1, it is desirable to set the switching frequency of the first and second switching elements Q1 and Q2 to 1 MHz or higher.

Figure 5:
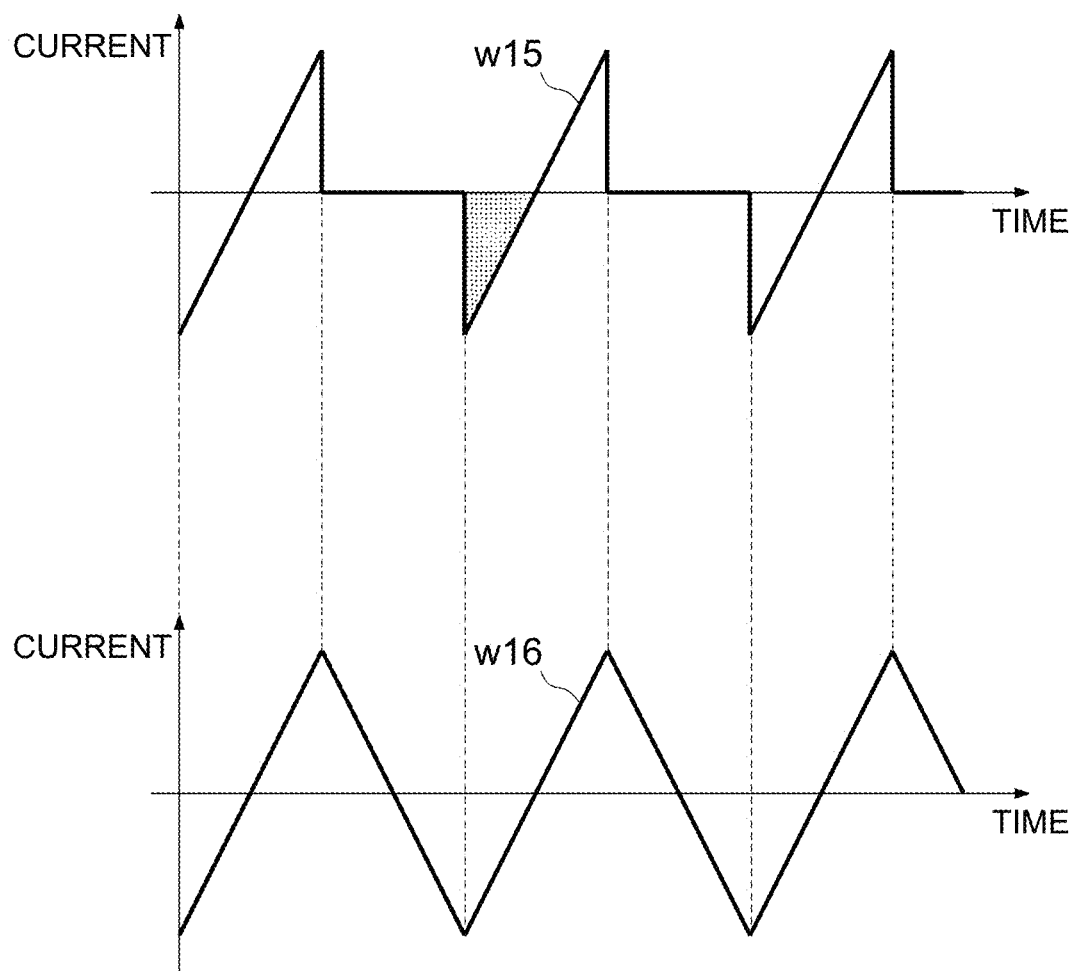
FIG. 5 illustrates the electric current waveform diagram of a first switching element and a first inductor.

FIG. 5 is a current waveform diagram of the first switching element Q1 and the first inductor L1. A waveform w15 represents the electric current waveform of the first switching element Q1, and a waveform w16 represents the electric current waveform of the first inductor L1. As illustrated, an electric current passes through the first switching element Q1 bidirectionally. The first inductance of the first inductor L1 is set so that the product (a gray area of FIG. 5) of a period in which the absolute value of the electric current passing through the first switching element Q1 changes from a maximum to zero and the absolute value of the electric current passing through the first switching element Q1 during that period is equal to or greater than the sum of the output capacitance and the circuit stray capacitance of the first and second switching elements Q1 and Q2.

Thus, in the first embodiment, the input voltage Vi consisting of a full-wave rectified voltage is inputted to the power conversion device 1 including the step-up and step-down chopper circuit illustrated in FIG. 1, the first and second switching elements Q1 and Q2 are alternately turned on at the switching frequency of 1 MHz or more, and the inductance of the first inductor L1 and the capacitance of the first and second capacitors C1 and C2 are adjusted, so that the full-wave rectified voltage Vo having the same voltage amplitude and phase as those of the input voltage Vi can be output. Thus, the switching frequency in the present embodiment is set to the frequency at which harmonic signals having the same voltage amplitudes and phases as those of the harmonic signals from the first to tenth harmonic signals of the first full-wave rectified voltage (input voltage) Vi can be output from the second and third terminals TL2 and TL3.

When a plurality of power conversion devices 1 of FIG. 1 are arranged in a row and the output terminals of respective power conversion devices 1 are connected in series, the voltage Vo output from each output terminal can have a uniform voltage amplitude and phase, so that the full-wave rectified voltage of a large voltage level can be generated without complicated control.

Second Embodiment

As described above, in the power conversion device 1 according to the first embodiment, it is necessary to increase the switching frequency of the first and second switching elements Q1 and Q2 to, for example, 1 MHz or higher. However, when the switching frequency is higher, the power loss increases and the power consumption also increases. A converter using a resonance circuit has been proposed as a method of reducing the power loss.

Figure 6:
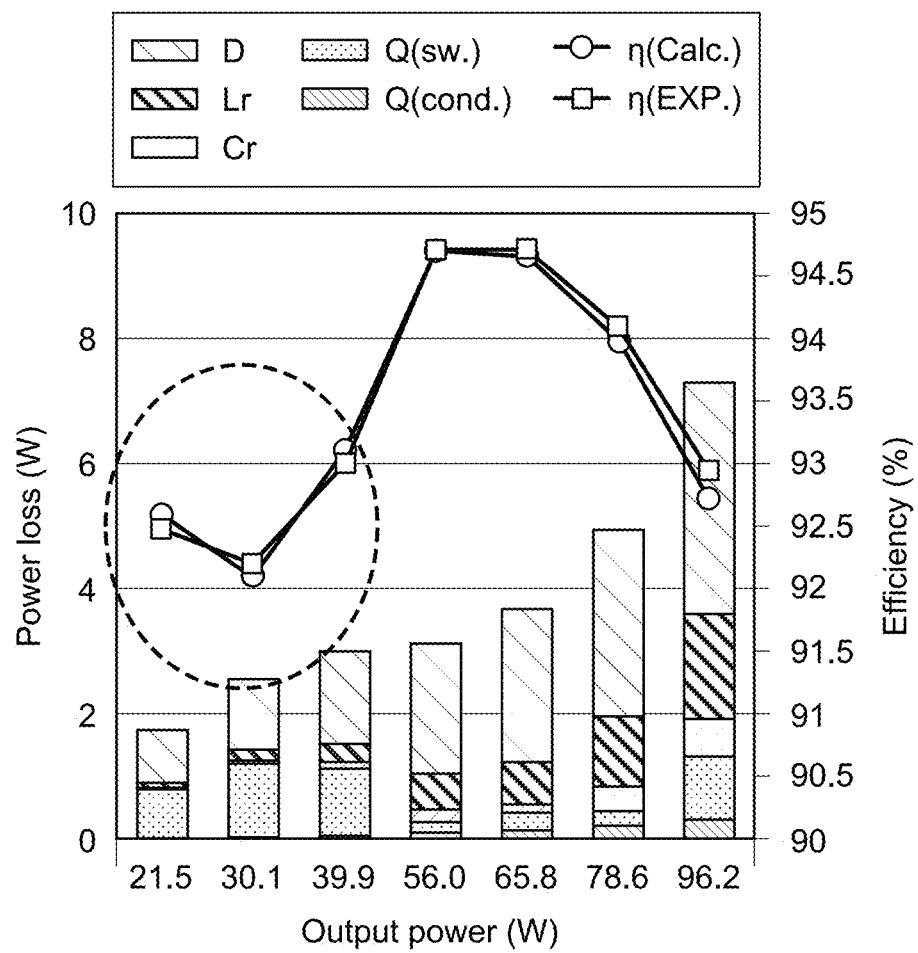
FIG. 6 is a graph illustrating the measurement results of the efficiency characteristics of a series resonant converter.

FIG. 6 is a graph illustrating the measurement results of the efficiency characteristics of the series resonance converter. The circuit configuration of the series resonance converter to provide FIG. 6 is recited in, for example, K. Sano and H. Fujita, "Voltage-Balancing Circuit Based on a Resonant Switched-Capacitor Converter for Multilevel Inverters", IEEE TRANSACTIONS ON INDUSTRY APPLICATIONS, VOL. 44, NO. 6, NOVEMBER/DECEMBER 2008.

In the line graph of FIG. 6, the horizontal axis is the output power, and the vertical axis is the power conversion efficiency (right). The smaller the value on the vertical axis, the poorer the power efficiency. The vertical axis of the bar graph illustrates the power loss (left). In the region where the output power is small as indicated by the broken line in FIG. 6, that is, at a light load, the ratio of power loss to the output power increases, and the power efficiency is deteriorated.

The present embodiment aims to arrange a plurality of power supply modules to generate a high-voltage full-wave rectified voltage, and the proposed power conversion device is connected and used between the output terminals of the plurality of power supply modules to equalize the voltages of the plurality of power supply modules, so that the proposed power conversion device is not assumed to operate at a high load. In the present embodiment, therefore, the series resonance converter including the resonance circuit is not adopted.

Instead of providing the resonance circuit, a power conversion device 1a according to the present embodiment reduces the power loss by soft switching the switching elements. More specifically, the power loss at the switching element is reduced by passing a bidirectional triangular current through the inductor in the power conversion device 1a to control the turn-on timing of the switching element. Herein, in the present specification, such control is referred to as a triangular current mode (TCM).

Figure 7:
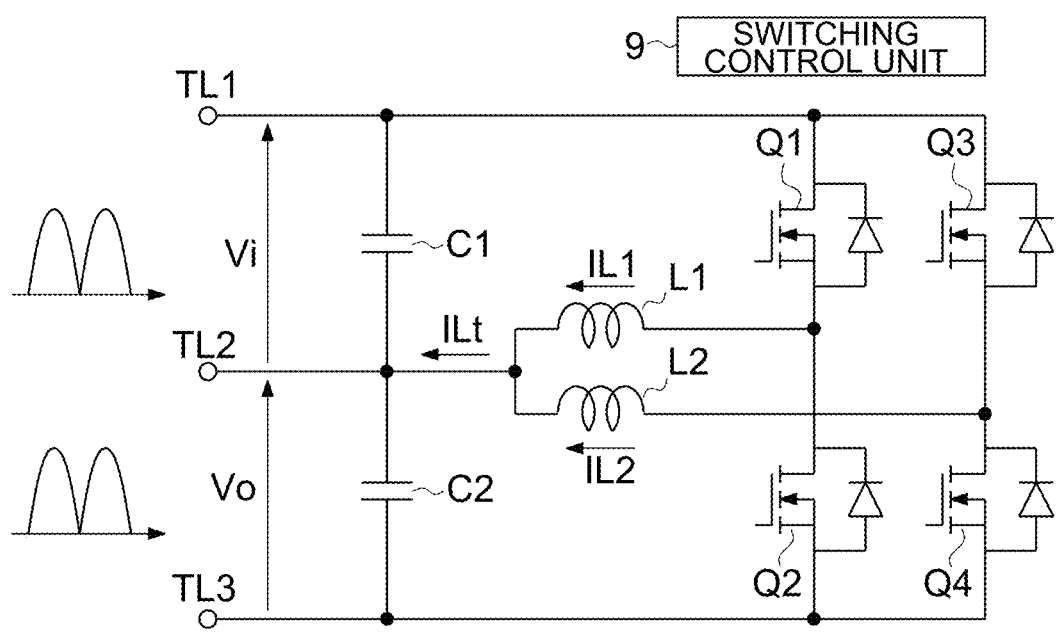
FIG. 7 is a circuit diagram of a power conversion device according to a second embodiment.

FIG. 7 is a circuit diagram of the power conversion device 1a according to the second embodiment. Similar to FIG. 1, the power conversion device 1a of FIG. 7 includes the first switching element Q1 and the first inductor L1 connected in series between the first and second terminals TL1 and TL2 and the first inductor L1, and the second switching element Q2 connected in series between the second terminal TL2 and the third terminal TL3. In addition, the power conversion device 1a of FIG. 7 includes a third switching element Q3 and a second inductor L2 connected in series between the first and second terminals TL1 and TL2, and the second inductor L2 and a fourth switching element Q4 connected in series between the second and third terminals TL2 and TL3.

Thus, the power conversion device 1a of FIG. 7 includes the first and second switching elements Q1 and Q2 cascode-connected between the first and third terminals TL1 and TL3, and the third and fourth switching elements Q3 and Q4 also cascode-connected between the first and third terminals TL1 and TL3, the first inductor L1 connected between the connection nodes of the first and second switching elements Q1 and Q2 and the second terminal TL2, and the second inductor L2 connected between the connection node of the third and fourth switching elements Q3 and Q4 and the second terminal TL2.

The switching control unit 9 controls on/off of the first to fourth switching elements Q1 to Q4. More specifically, the switching control unit 9 controls on/off of the first to fourth switching elements Q1 to Q4 such that the second and third switching elements Q2 and Q3 are both turned off during the period when the first and fourth switching elements Q1 and Q4 are both on, and that the second and third switching elements Q2 and Q3 are both turned on during the period when the first and fourth switching elements Q1 and Q4 are both off.

When a first full-wave rectified voltage is input between the first and second terminals TL1 and TL2, the switching frequencies of the first to fourth switching elements Q1 to Q4, the inductance of the first and second inductors L1 and L2, and the capacitance of the first and second capacitors C1 and C2 are set such that, a second full-wave rectified voltage having the same voltage amplitude and phase as those of the first full-wave rectified voltage is output from between the second and third terminals TL2 and TL3.

In the power conversion device 1a of FIG. 7, the first and fourth switching elements Q1 and Q4 are turned on or off simultaneously, while the second and third switching elements Q2 and Q3 are turned on or off simultaneously. During a period in which the first switching element Q1 and the fourth switching element Q4 are simultaneously turned on, the electric current passes from the first terminal TL1, the first switching element Q1, the first inductor L1, and the second terminal TL2 in this order. Further, the electric current passes from the second terminal TL2, the second inductor L2, the fourth switching element Q4, and the third terminal TL3 in this order.

During a period in which the second and third switching elements Q2 and Q3 are simultaneously turned on, the electric current passes from the first terminal TL1, the third switching element Q3, the second inductor L2, and the second terminal TL2 in this order. Further, the electric current passes from the second terminal TL2, the first inductor L1, the second switching element Q2, and the third terminal TL3 in this order.

The switching control unit 9 performs soft switching of the first to fourth switching elements Q1 to Q4. More specifically, the switching control unit 9 causes a bidirectional electric current to pass through the first and second inductors L1 and L2. When the minimum (negative maximum value) electric current passes from the first or second inductor L1 or L2 to the second terminal TL2, the switching control unit 9 issues an on-command for the first and fourth switching elements Q1 and Q4 or an on-command for the second and third switching elements Q2 and Q3.

Figure 8:
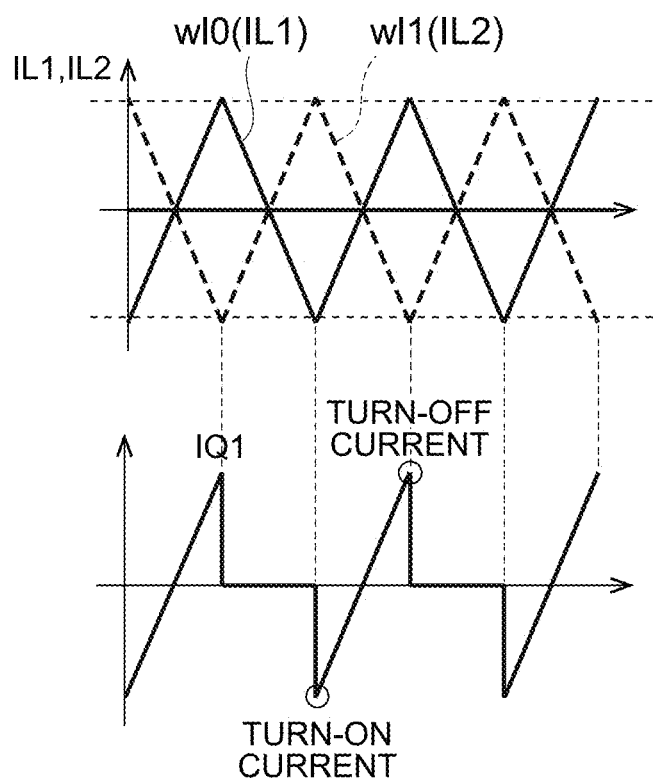
FIG. 8 is a current waveform diagram of the electric current passing through a first inductor and a second inductor, and a current waveform diagram of the first switching element.

FIG. 8 illustrates current waveforms w10 and w11 of an electric current IL1 passing through the first inductor L1 and an electric current IL2 passing through the second inductor L2, and a current waveform diagram of the first switching element Q1. As illustrated in FIG. 8, the electric currents IL1 and IL2 have inverted phases and are triangular currents whose electric current values linearly change in a constant cycle from the positive direction to the negative direction. In FIG. 8, the direction in which the electric currents IL1 and IL2 pass to the second terminal TL2 side is the positive direction, and the direction to the first to fourth switching elements Q1 to Q4 side is the negative direction.

On the lower side of FIG. 8, the timing at which the first to fourth switching elements Q1 to Q4 are turned on and off are indicated by circles. As illustrated, the switching control unit 9 issues a command to turn on the first and fourth switching elements Q1 and Q4 when the electric current IL1 has a maximum value in a negative direction (the direction from L1 to TL2 is a positive direction). When the electric current IL1 has the maximum value in the positive direction, the switching control unit 9 issues a command to turn on the second and third switching elements Q2 and Q3.

Thus, the switching control unit 9 issues the command to turn on the first and fourth switching elements Q1 and Q4 or the second and third switching elements Q2 and Q3 while the electric current passes from the first or second inductor L1 or L2 to the second terminal TL2 side. The period in which the electric current passes from the second terminal TL2 to the first or second inductor L1 or L2 is a power regeneration period, and power loss can be controlled by turning on the first or third switching element Q1 or Q3 during this period.

If GaN transistors are used as the first to fourth switching elements Q1 to Q4, the GaN transistor has inherently a large power loss at turn-on and a small power loss at turn-off, so that the switching control according to the present embodiment can be significantly reduced by performing the switching control.

Figure 9:
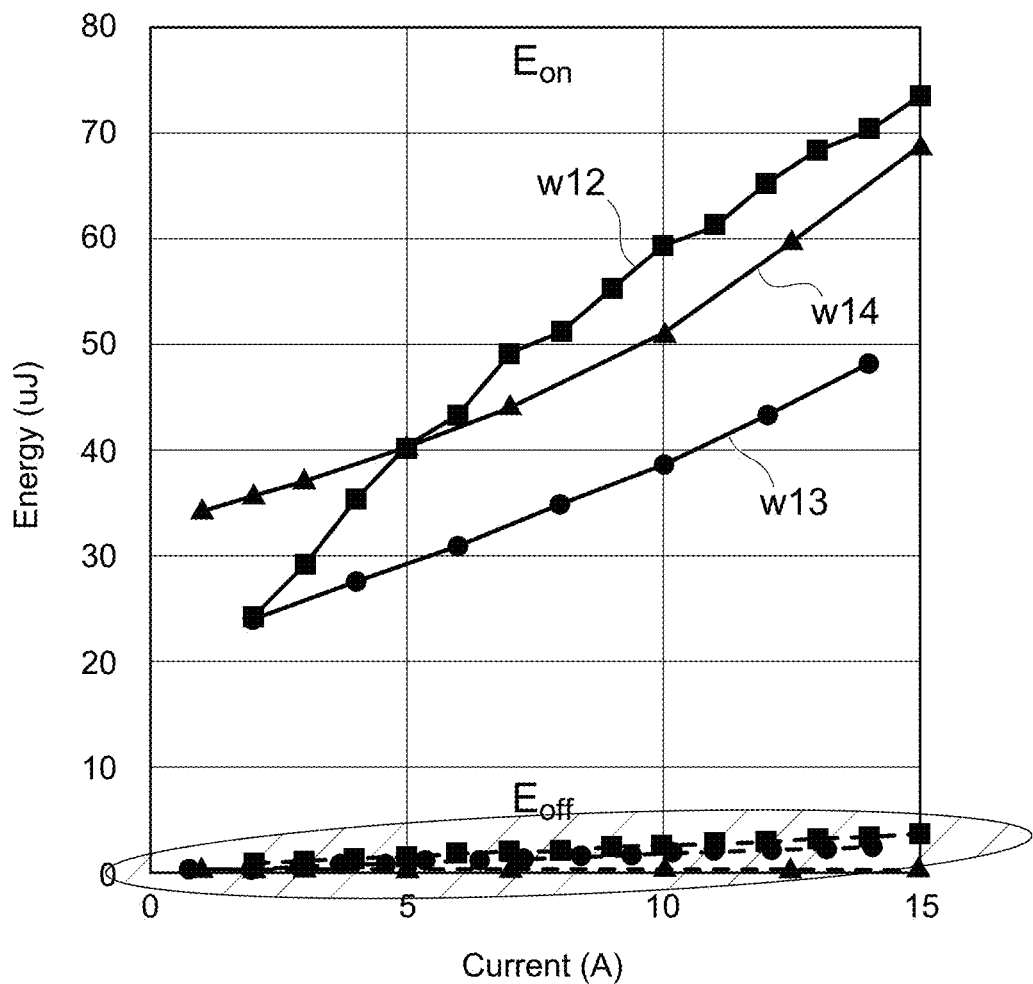
FIG. 9 is a graph illustrating the switching loss of a GaN transistor.

FIG. 9 is a graph illustrating the switching loss of a GaN transistor. The graph of FIG. 9 is quoted from Z. Liu, F. C. Lee, Q. Li and Y. Yang, "Design of GaN-Based MHz Totem-Pole PFC Rectifier", IEEE JOURNAL OF EMERGING AND SELECTED TOPICS IN POWER ELECTRONICS, VOL. 4, NO. 3, SEPTEMBER 2016.

In FIG. 9, the horizontal axis is the electric current (A), and the vertical axis is the power loss ($\mu$J). FIG. 9 illustrates the switching loss waveforms w12 to w14 of three types of GaN transistors. The waveforms w12 to w14 illustrate the power loss at the time when each GaN transistor is turned on. It can be seen from FIG. 9 that all types of GaN transistors have a large switching loss at turn-on and a small switching loss at turn-off. Therefore, the power loss of the GaN transistor, which inherently has a large power loss, can be suppressed by performing the switching control according to the present embodiment.

The power conversion device 1a of FIG. 7 includes a total of four switching elements, but more than six switching elements may be provided.

Figure 10:
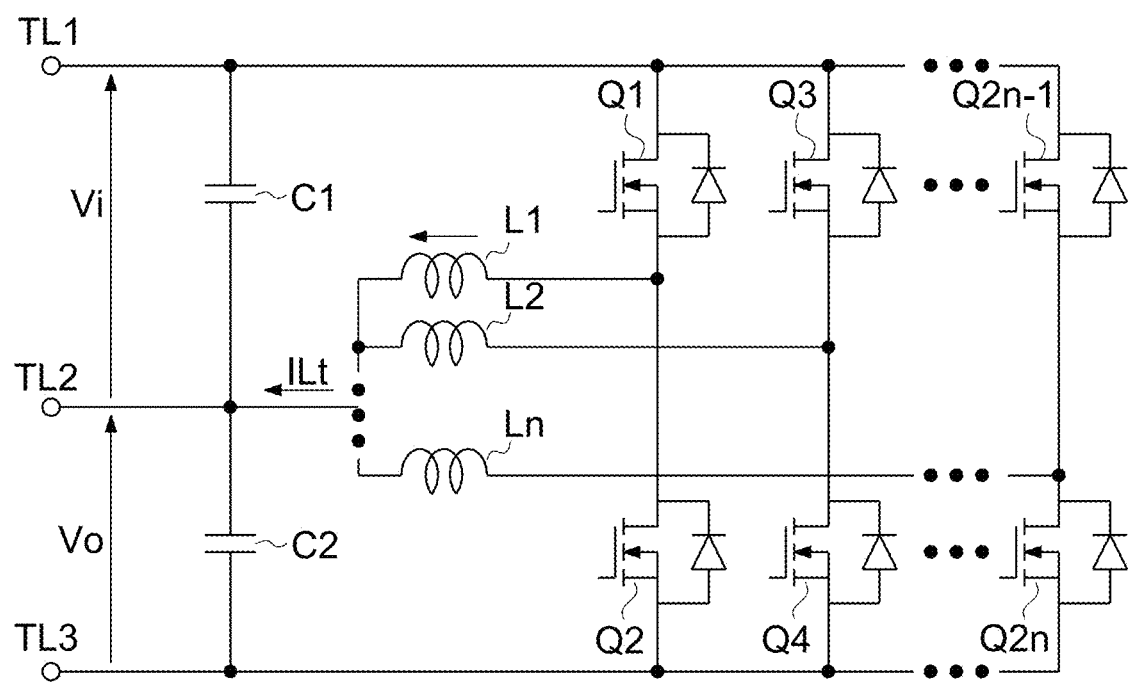
FIG. 10 is a circuit diagram of a power conversion device including m step-up and step-down chopper circuits.

FIG. 10 is a circuit diagram of a power conversion device 1b including n (n is an integer of 2 or more) step-up and step-down chopper circuits having the same circuit configuration as in FIG. 7. Each chopper circuit of FIG. 10 includes two switching elements cascode-connected between the first and third terminals TL1 and TL3, and an inductor connected between the connection node of the two switching elements and the second terminal TL2.

The example in FIG. 10 includes n pairs of switching elements, each pair consisting of two switching elements that are cascode-connected between the first and third terminals TL1 and TL3. By increasing the number of chopper circuits, soft switching can be performed in a more finely tuned manner.

Thus, in the second embodiment, the power loss can be reduced because the on/off switching of each switching element is performed by soft switching.

Third Embodiment

A third embodiment incorporates the power conversion device 1, 1a, or 1b according to the first or second embodiment into a power supply module that outputs the full-wave rectified voltage.

Figure 11:
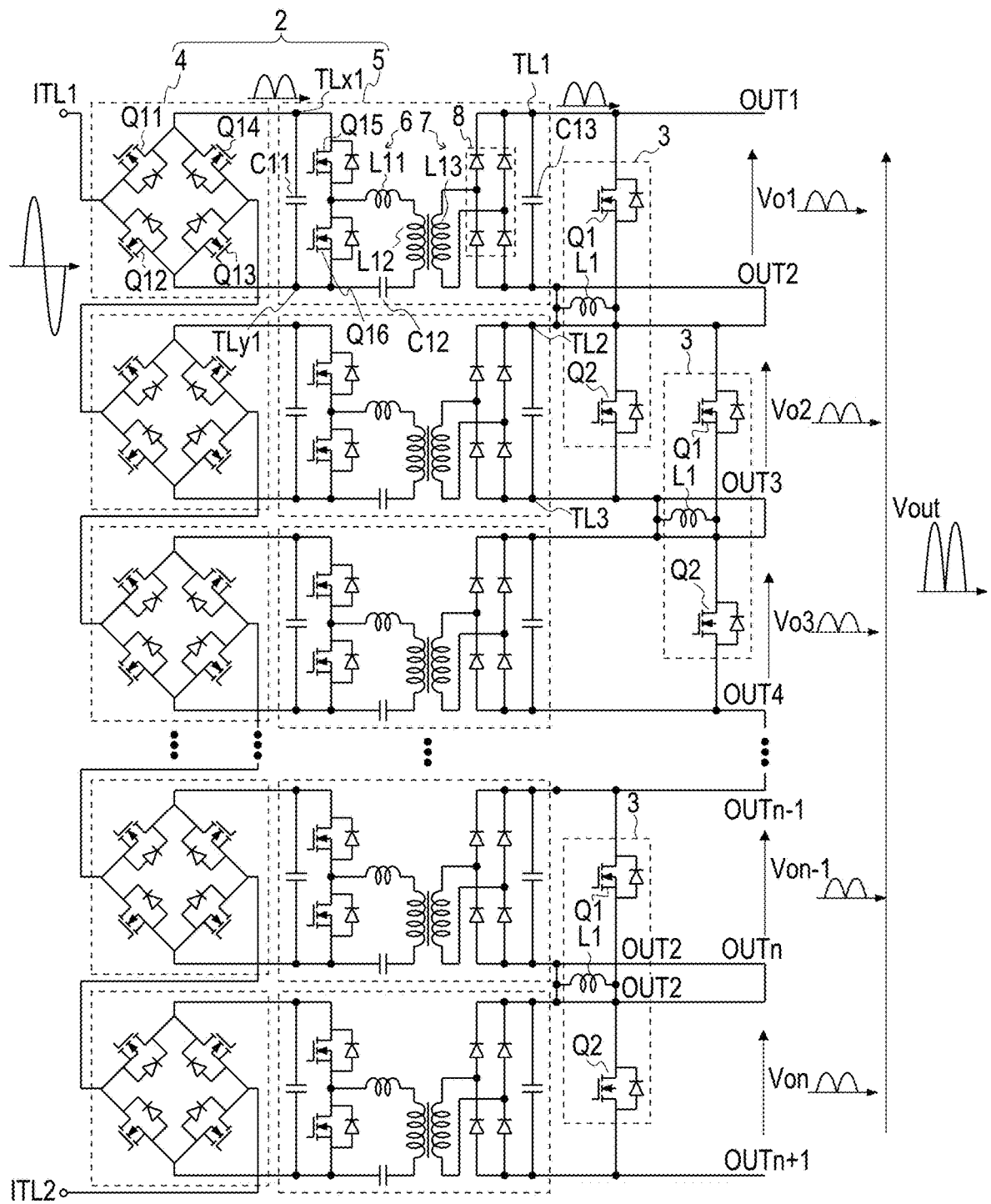
FIG. 11 is a circuit diagram of a power supply device including the power conversion device according to a third embodiment.

FIG. 11 is a circuit diagram of a power supply device 11 including the power conversion device 1 according to the third embodiment. The power supply device of FIG. 11 includes the power conversion device 1 having the same configuration as the configuration of FIG. 1, but may include the power conversion device 1a of FIG. 7 or the power conversion device 1b of FIG. 10. The power supply device 11 of FIG. 11 includes the first and second input terminals ITL1 and ITL2 to which the AC input voltage is input, n (n is an integer of 2 or more) AC-DC converters 2, and (n-1) voltage balance circuits 3. The power supply device 11 of FIG. 11 constitutes input series output series (ISOS) multi-cell converters.

The first and second input terminals ITL1 and ITL2 receive an AC input voltage of, for example, several hundred volts to several thousand volts.

Each input terminal of the n AC-DC converters 2 is connected in series to the first and second input terminals ITL1 and ITL2. Therefore, each AC-DC converter 2 receives a divided voltage having a voltage amplitude of 1/n times the voltage amplitude of the AC input voltage. The AC-DC converters 2 convert the input partial voltage into the full-wave rectified voltage to be output from the output terminal.

Each AC-DC converter 2 includes a full-wave rectifier circuit 4 and a DC-DC converter 5. Each full-wave rectifier circuit 4 includes four switching elements Q11 to Q14. By alternately turning on the switching elements Q11 and Q13 and the switching elements Q12 and Q14, the AC input voltage is converted into the full-wave rectified voltage.

Each DC-DC converter 5 includes a primary-side circuit 6 and a secondary-side circuit 7 which are electrically insulated from each other. The primary-side circuit 6 includes two switching elements Q15 and Q16 cascode-connected between the first and second terminals TLx1 and TLy1, a capacitor C11, two inductors L11 and L12 connected in series between the connection node of the switching elements Q15 and Q16 and the source of the switching element Q16, and a capacitor C12. The secondary-side circuit 7 includes an inductor L13 that is magnetically coupled to the inductor L12, a full-wave rectifier circuit 8, and a capacitor C13.

Of the output terminals of the n AC-DC converters 2, a voltage balance circuit 3 is connected to the output terminals of two sets of two adjacent AC-DC converters 2 in a ratio of one. Therefore, (n−1) voltage balance circuits 3 are provided for n AC-DC converters 2. The voltage balance circuit 3 has a circuit configuration similar to the circuit configuration of the power conversion device 1, 1a, or 1b of FIG. 1, 7, or 10, respectively.

With only n AC-DC converters 2, even if the AC-DC converters 2 are designed to have the identical internal configuration, the voltage amplitude and phase of the full-wave rectified voltages output from the AC-DC converters 2 do not always match due to variations in the capacitance value of capacitor C13 and other factors. Therefore, in order to provide uniform voltage amplitudes of the n full-wave rectified voltages output from the n AC-DC converters 2, and to provide the uniform phase as well, the (n−1) voltage balance circuits 3 are provided.

The voltage balance circuit 3 of FIG. 11 has the same circuit configuration as the power conversion device 1 of FIG. 1, but may have the same circuit configuration as the power conversion device 1a of FIG. 7 or the power conversion device 1b of FIG. 10, as described below. In the following, the output terminal of one of the two adjacent AC-DC converters 2 is referred to as OUT1 and OUT2, and the output terminals of the other AC-DC converter 2 are referred to as OUT2 and OUT3.

The first and second switching elements Q1 and Q2 in the voltage balance circuit 3 are cascode-connected between the output terminals OUT1 and OUT3. The first inductor L1 is connected between the connection node of the first and second switching elements Q1 and Q2 and the output terminal OUT2.

By providing the voltage balance circuit 3 as illustrated in FIG. 11 and turning on/off the first and second switching elements Q1 and Q2 at a predetermined duty ratio (e.g., 50%), the voltage Vo1 between the output terminals OUT1 and OUT2 and the voltage Vo1 between the output terminals OUT2 and OUT3 can have the same voltage amplitude and phase. Accordingly, the third embodiment including the n AC-DC converters 2 provides the output voltage Vout as the full-wave rectified voltage obtained by summing up voltages Vo1, Vo2, . . . , Von which are the output voltages of the n AC-DC converters 2.

In the voltage balance circuit 3 of FIG. 11, the switching frequency of the first and second switching elements Q1 and Q2 needs to be increased to about 1 MHz to enable power conversion of the full-wave rectified voltage output from the AC-DC converter 2 up to the tenth harmonic voltage, thus causing a large power loss, as described above. Therefore, it is desirable to soft-switch the first and second switching elements Q1 and Q2 by providing the internal configuration of the power balancing circuit similar to the internal configuration of the power conversion device 1a of FIG. 7.

Figure 12:
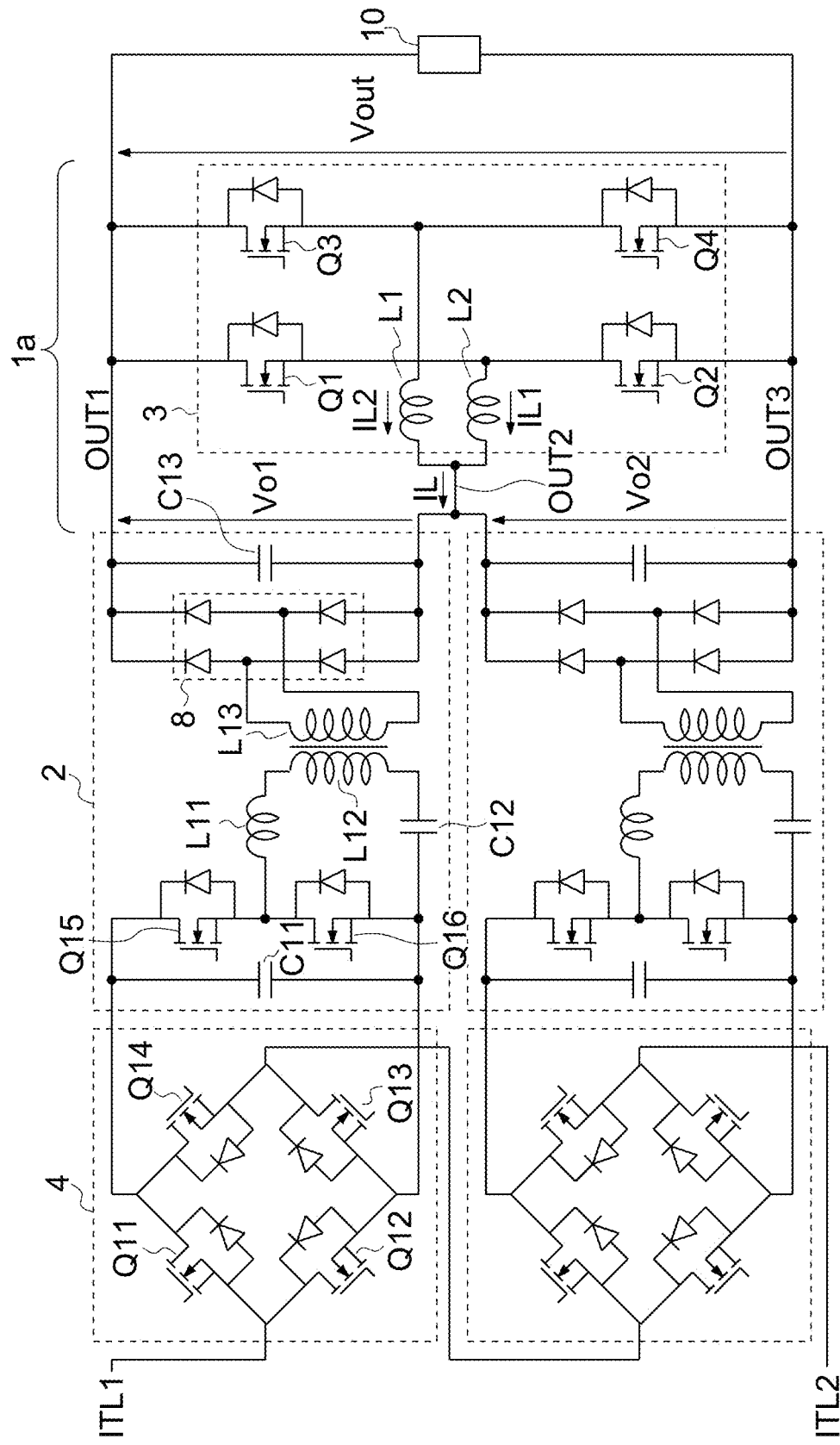
FIG. 12 is a circuit diagram of a power supply device having the internal configuration of the voltage balance circuit similar to the internal configuration of the power conversion device of FIG. 6.

FIG. 12 is a circuit diagram of a power supply device 11a in which the internal configuration of the voltage balance circuit 3a is similar to the internal configuration of the power conversion device 1a of FIG. 7. The first and second switching elements Q1 and Q2 in a voltage balance circuit 3a of FIG. 12 are cascode-connected between the output terminals OUT1 and OUT3 of the AC-DC converter 2. Similarly, the third and fourth switching elements Q3 and Q4 are also cascode-connected between the output terminals OUT1 and OUT3. The first inductor L1 is connected between the connection node of the first and second switching elements Q1 and Q2 and the output terminal OUT2. The second inductor L2 is connected between the connection node of the third and fourth switching elements Q3 and Q4 and the output terminal OUT2.

The voltage balance circuit 3a of FIG. 12 is driven in the triangular current mode so that the electric current passing in the first and second inductors L1 and L2 has the triangular wave, as described in FIG. 8. Accordingly, the first to fourth switching elements Q1 to Q4 can be soft-switched, and power loss can be suppressed.

Figure 13:
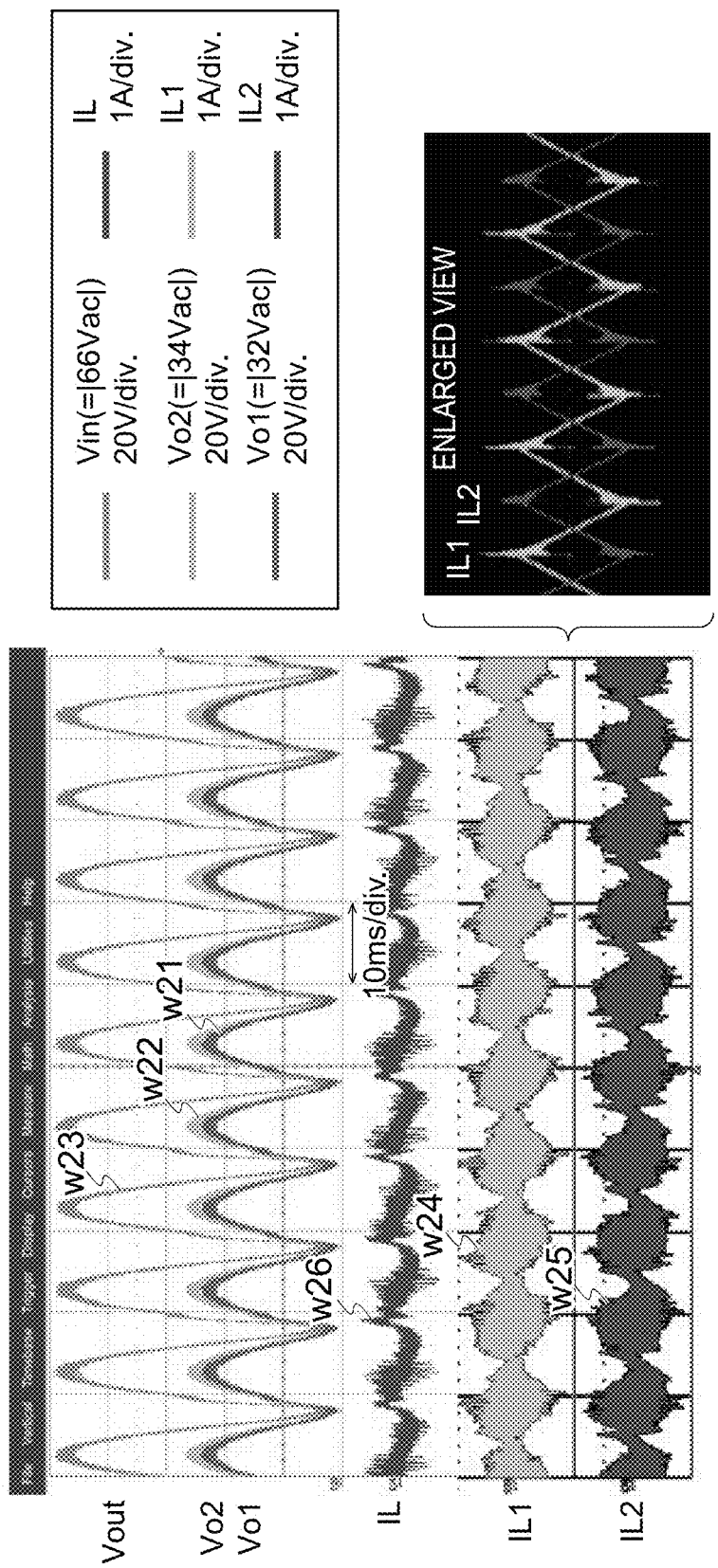
FIG. 13 is a waveform diagram of each part of the power conversion device of FIG. 11 when actually operated.

The inventor of the present invention has conducted an experiment of actually operating the power supply device 11a of FIG. 12 by connecting a 20-ohm load 10. FIG. 13 is a waveform diagram of each part of the power supply device 11a of FIG. 12 when actually operated. FIG. 13 illustrates waveforms of the power supply device 11a of FIG. 12: a waveform w23 of the output voltage Vout, a waveform w21 of the input voltage Vo1 of the voltage balance circuit 3a, a waveform w22 of the output voltage Vo1 of the voltage balance circuit 3a, a waveform w26 of the electric current IL passing from the connection point of the first and second inductors L1 and L2 to the output terminal OUT2, a waveform w24 of the electric current IL1 passing through the first inductor L1, and a waveform w25 of the electric current IL2 passing through the second inductor L2. Also illustrated is an enlarged waveform diagram of the electric currents IL1 and IL2.

As can be seen from FIG. 13, both the voltage amplitude and the phase of the output voltages Vo1 and Vo1 of the AC-DC converter 2 are nearly identical.

Figure 14:
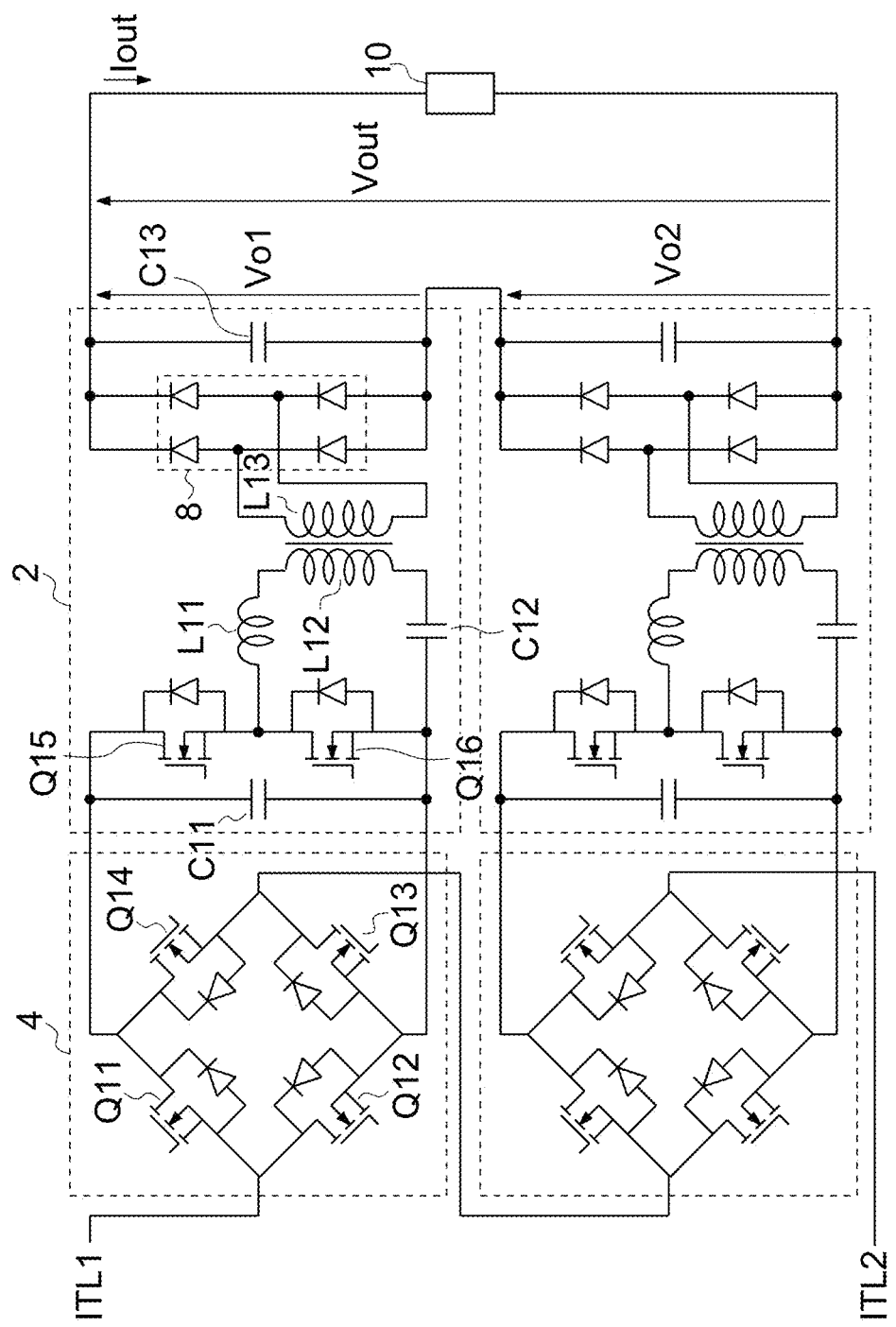
FIG. 14 is a circuit diagram of a power supply device of a comparative example without a voltage balance circuit.

The inventor of the present invention has similarly conducted an experiment of actually operating a power supply device 11b having the circuit configuration in which the voltage balance circuit 3a is omitted from the power supply device 11a of FIG. 12 by connecting the 20-ohm load 10. FIG. 14 is the circuit diagram of the power supply device lib of a comparative example which does not include the voltage balance circuit 3a. The configuration is similar to the configuration of the power supply device 11a in FIG. 12, except that the voltage balance circuit 3a is omitted.

Figure 15:
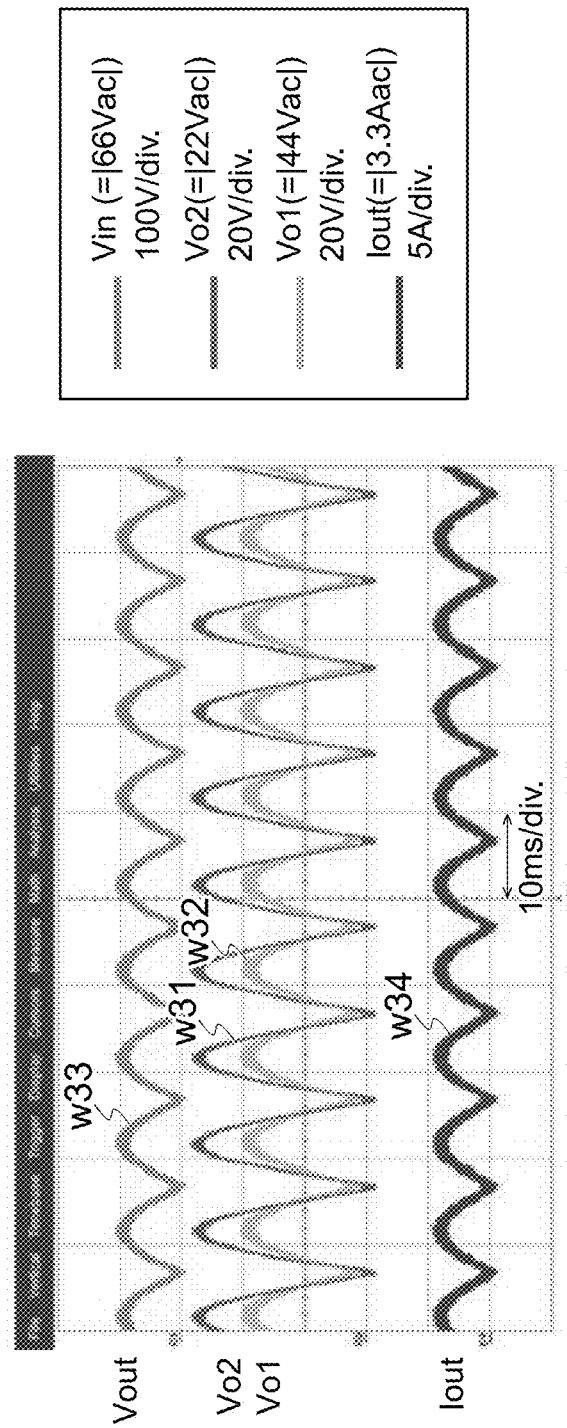
FIG. 15 is a waveform diagram of each part of the power conversion device of FIG. 13 when actually operated.

FIG. 15 is a waveform diagram of each part of the power supply device lib of FIG. 14 when actually operated. FIG. 15 illustrates a waveform w33 of the input voltage Vin of the AC-DC converter 2, a waveform w31 of the output voltage Vo1 between the output terminals OUT1 and OUT2 of the AC-DC converter 2, a waveform w32 of the output voltage Vo1 between the output terminals OUT2 and OUT3, and a waveform w34 of the load current.

As can be seen from FIG. 15, without the voltage balance circuit 3 or 3a, the voltage amplitudes of the output voltages Vo1 and Vo1 of the AC-DC converter 2 do not match, so that the operation of the power supply device 11b becomes unstable.

Thus, the power conversion devices 1, 1a, or 1b described in the first and second embodiments can be applied to the voltage balance circuit 3 or 3a provided on the rear side of a plurality of AC-DC converters 2. This enables the amplitude and phase of the voltage output from each output terminal to be matched when each input terminal of the plurality of AC-DC converters 2 is connected in series and each output terminal is also connected in series.

For example, when a plurality of AC-DC converters 2 are lined and the input terminals of the plurality of AC-DC converters 2 are connected in series, and the output terminals of the plurality of AC-DC converters 2 are also connected in series, the voltage amplitude and phase of the full-wave rectified voltage vary, as it is, when output from each output terminal. However, by connecting the above-described voltage balance circuit 3 or 3a to each output terminal, the voltage amplitude and phase of the full-wave rectified voltage output from each output terminal can be made consistent. This allows a plurality of AC-DC converters 2 to be lined up and each output terminal to be connected in series to generate a high voltage full-wave rectified voltage.

Fourth Embodiment

A power conversion device 1c according to a fourth embodiment has an insulating configuration.

Figure 16:
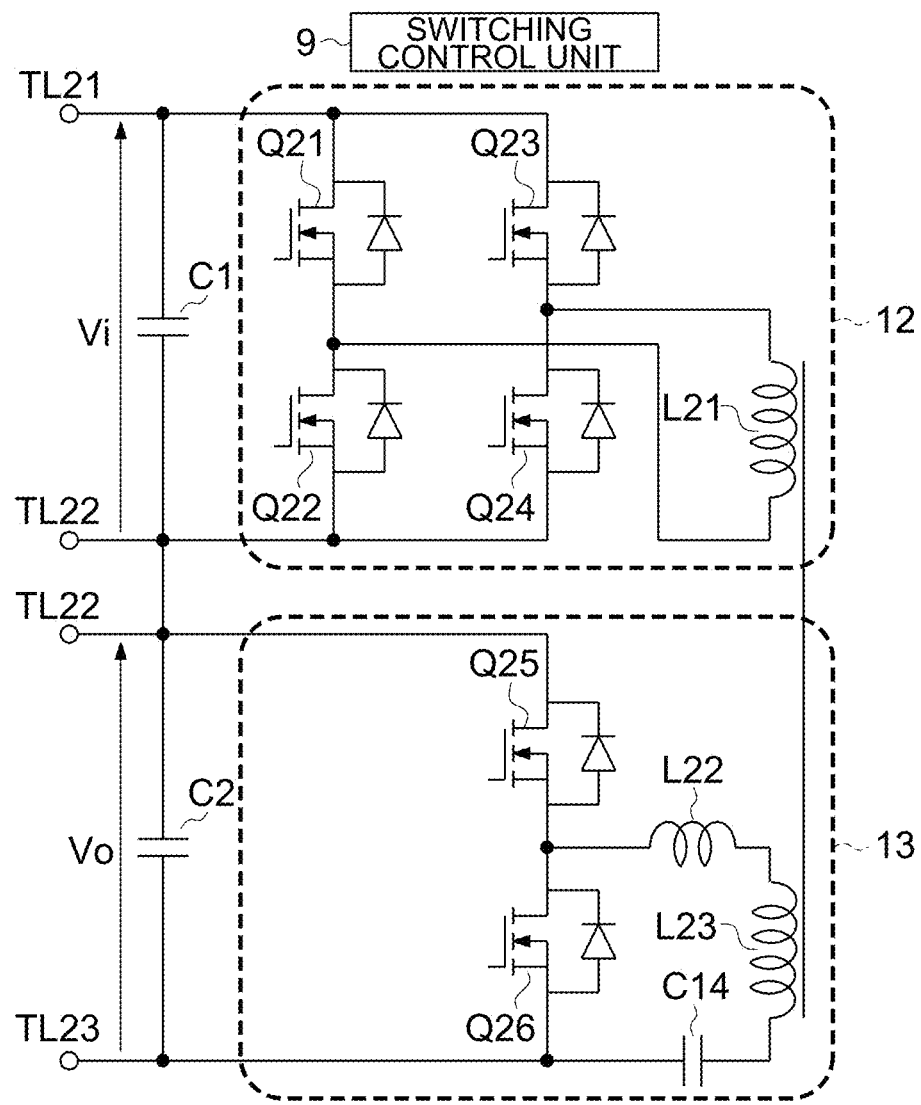
FIG. 16 is a circuit diagram of a power conversion device according to a fourth embodiment.

FIG. 16 is a circuit diagram of the power conversion device 1c according to the fourth embodiment. The upper side of the power conversion device 1c in FIG. 16 illustrates the configuration of a primary-side circuit 12 such as an AC-DC converter. The primary-side circuit 12 is magnetically coupled to a secondary-side circuit 13 on the lower side of FIG. 16 in an electrically insulated state. The primary-side circuit 12 and the secondary-side circuit 13 have first to sixth switching elements Q21 to Q26, first to third inductors L21 to L23, and a capacitor C14.

The first and second switching elements Q21 and Q22 are cascode-connected between the first and second terminals TL21 and TL22. Similarly, the third and fourth switching elements Q23 and Q24 are cascode-connected between the first and second terminals TL21 and TL22. The first inductor L21 is connected between the connection node of the first and second switching elements Q21 and Q22 and the connection node of the third and fourth switching elements Q23 and Q24.

The fifth and sixth switching elements Q25 and Q26 are cascode-connected between the second and third terminals TL22 and TL23. The second and third inductors L22 and L23 are connected in series between the connection node of the fifth and sixth switching elements Q25, Q26 and the third terminal TL23. The first and third inductors L21 and L23 are magnetically coupled.

The switching control unit 9 performs on/off control of the first to sixth switching elements Q21 to Q26. The switching control unit 9 turns on or off the first and fourth switching elements Q21 and Q24 in synchronization. Similarly, the switching control unit 9 turns on or off the second and third switching elements Q22 and Q23 in synchronization. The switching control unit 9 performs control to turn off the second and third switching elements Q22 and Q23 while the first switching element Q21 and the fourth switching element Q24 are on, and turn on the second and third switching elements Q22 and Q23 while the first switching element Q21 and the fourth switching element Q24 are off. Further, the switching control unit 9 performs control to turn on one of the fifth switching element Q25 and the sixth switching element Q26 and turn off the other. The switching control unit 9 performs on/off control of the fifth switching element Q25 and the sixth switching element Q26 in synchronization with on/off control of the first to fourth switching elements Q1 to Q4.

A full-wave rectified voltage is input between the first and second terminals TL21 and TL22. A full-wave rectified voltage having the same voltage amplitude and the same phase as the full-wave rectified voltage input between the first terminal TL21 and the second terminal TL22 is output from between the second terminal TL22 and the third terminal TL23.

Similar to the first embodiment, the switching frequencies of the first to sixth switching elements Q21 to Q26 are accelerated to allow the power conversion up to the tenth harmonic of the full-wave rectified voltage input between the first and second terminals TL21 and TL22. Therefore, similar to the second embodiment, the first to sixth switching elements Q21 to Q26 may be soft-switched.

As described above, even the insulated power conversion device 1c can output a full-wave rectified voltage having the same voltage amplitude and the same phase as those of the input full-wave rectified voltage.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. A power conversion device, comprising:
a first switching element and a first inductor connected in series between a first terminal and a second terminal, the first inductor and a second switching element being connected in series between the second terminal and a third terminal;
a switching controller that alternately turns on and off the first switching element and the second switching element at a predetermined duty ratio;
a first capacitor connected between the first terminal and the second terminal; and
a second capacitor connected between the second terminal and the third terminal, wherein
when a first full-wave rectified voltage is input between the first and second terminals, a switching frequency of the first switching element, a switching frequency of the second switching element, an inductance of the first inductor, a capacitance of the first capacitor, and a capacitance of the second capacitor are set in a manner that a second full-wave rectified voltage having a voltage amplitude and a phase which are identical to the voltage amplitude and the phase of the first full-wave rectified voltage is output from between the second and third terminals.

2. The power conversion device according to claim 1, wherein
the switching frequency is a frequency capable of outputting, from the second terminal and the third terminal, a harmonic signal having a voltage amplitude and a phase which are identical to the voltage amplitude and the phase of a harmonic signal of first to tenth harmonic signals of the first full-wave rectified voltage.

3. The power conversion device according to claim 1, wherein
the predetermined duty ratio is 50%.

4. The power conversion device according to claim 1, wherein
an electric current passes bidirectionally through the first inductor, and
a first inductance of the first inductor is set in a manner that a product of a period of time in which an absolute value of the electric current passing through the first inductor changes from a maximum value to zero and the absolute value of the electric current passing through the first inductor during the period of time is equal to or greater than a sum of output capacitance of the first and second switching elements and circuit stray capacitance.

5. The power conversion device according to claim 1, further comprising:
a third switching element and a second inductor connected in series between the first terminal and the second terminal; and
a fourth switching element and the second inductor connected in series between the second terminal and the third terminal, wherein
the switching controller controls on or off of the first to fourth switching elements in a manner that the second and third switching elements are both turned off within a period of time when both the first and fourth switching elements are on, and the second and third switching elements are both turned on within a period of time when both the first and fourth switching elements are off.

6. The power conversion device according to claim 5, wherein
when the first full-wave rectified voltage is input between the first and second terminals, the switching frequency of the first to fourth switching elements, the inductance of the first and second inductors, and the capacitance of the first and second capacitors are set in a manner that the second full-wave rectified voltage having the voltage amplitude and phase identical to the voltage amplitude and phase of the first full-wave rectified voltage is output from between the second and third terminals.

7. The power conversion device according to claim 5, wherein
the switching controller performs soft switching of the first to fourth switching elements by passing the electric current bidirectionally through the first inductor and the second inductor.

8. The power conversion device according to claim 5, wherein
a bidirectional and opposite-phase electric current passes through the first inductor and the second inductor, and
when the electric current passing from the first inductor or the second inductor to the second terminal is at a minimum, the switching controller issues an on-command of the first and fourth switching elements or an on-command of the second and third switching elements.

9. The power conversion device according to claim 1, further comprising:
m (m is an integer of 2 or more) voltage balance circuits connected to the first to third terminals, wherein
the switching controller controls the m voltage balance circuits,
each of the m voltage balance circuits comprises
the first and second switching elements cascode-connected between the first and third terminals, and
the first inductor connected between a connection node of the first and second switching elements and the second terminal, and
the switching controller applies the electric current bidirectionally to the first inductor in each of the voltage balance circuits to perform soft switching of the first and second switching elements.

10. A power conversion device, comprising:
first and second switching elements cascode-connected between a first terminal and a second terminal;
third and fourth switching elements cascode-connected between the first terminal and the second terminal;
a first inductor connected between a connection node of the first and second switching elements and a connection node of the third and fourth switching elements;
fifth and sixth switching elements cascode-connected between the second terminal and a third terminal;
a second inductor, a third inductor, and a first capacitor connected in series between a connection node of the fifth and sixth switching elements and the third terminal;
a second capacitor connected between the first and second terminals;
a third capacitor connected between the second and third terminals; and
a switching controller that turns on or off the first to sixth switching elements at a predetermined duty ratio, wherein
when a first full-wave rectified voltage is input between the first and second terminals, a switching frequency of each of the first to sixth switching elements, an inductance of each of the first to third inductors, and a capacitance of each of the first to third capacitors are set in a manner that a second full-wave rectified voltage having a voltage amplitude and phase which are identical to the voltage amplitude and the phase of the first full-wave rectified voltage is output from between the second and third terminals.

11. The power conversion device according to claim 10, wherein
the switching controller turns off the second and third switching elements within a period of time when both the first and fourth switching elements are on, turns on the second and third switching elements within a period of time when both the first and fourth switching elements are off, and alternately turns on the fifth and sixth switching elements in synchronization with turning on or off of the first to fourth switching elements.

12. A power supply device, comprising:
first and second input terminals to which an AC input voltage is input;
n (n is an integer of 2 or more) AC-DC converters connected in series between the first and second input terminals and each converting a divided input voltage, which is obtained by dividing the AC input voltage, into a full-wave rectified voltage;
series-connected n output terminal pairs that output the full-wave rectified voltage converted by the n AC-DC converters; and
(n−1) voltage balance circuits connected to adjacent two output terminal pairs, respectively, among the n output terminal pairs, wherein
the voltage balance circuits each comprise
a first switching element and a first inductor connected in series between first and second terminals which are part of the adjacent two output terminal pairs, a second switching element and the first inductor connected in series between the second terminal and a third terminal which are part of the adjacent two output terminal pairs, a switching controller that alternately turns on and off the first and second switching elements at a predetermined duty ratio, a first capacitor connected between the first and second terminals, and a second capacitor connected between the second and third terminals, and when a first full-wave rectified voltage is input between the first and second terminals, a switching frequency of the first switching element, a switching frequency of the second switching element, an inductance of the first inductor, and a capacitance of the first capacitor, and a capacitance of the second capacitor are set in a manner that a second full-wave rectified voltage having a voltage amplitude and a phase which are identical to the voltage amplitude and the phase of the first full-wave rectified voltage is output from between the second and third terminals.

13. The power supply device according to claim 12, wherein
the switching frequency is a frequency capable of outputting, from the second terminal and the third terminal, a harmonic signal having a voltage amplitude and a phase which are identical to the voltage amplitude and the phase of a harmonic signal of first to tenth harmonic signals of the first full-wave rectified voltage.

14. The power supply device according to claim 12, wherein
the predetermined duty ratio is 50%.

15. The power supply device according to claim 12, wherein
an electric current passes bidirectionally through the first inductor, and
a first inductance of the first inductor is set in a manner that a product of a period of time in which an absolute value of the electric current passing through the first inductor changes from a maximum value to zero and the absolute value of the electric current passing through the first inductor during the period of time is equal to or greater than a sum of output capacitance of the first and second switching elements and circuit stray capacitance.

16. The power supply device according to claim 12, further comprising:
a third switching element and a second inductor connected in series between the first terminal and the second terminal; and
a fourth switching element and the second inductor connected in series between the second terminal and the third terminal, wherein the switching controller controls on or off of the first to fourth switching elements in a manner that the second and third switching elements are both turned off within a period of time when both the first and fourth switching elements are on, and the second and third switching elements are both turned on within a period of time when both the first and fourth switching elements are off.

17. The power supply device according to claim 16, wherein
when the first full-wave rectified voltage is input between the first and second terminals, the switching frequency of the first to fourth switching elements, the inductance of the first and second inductors, and the capacitance of the first and second capacitors are set in a manner that the second full-wave rectified voltage having the voltage amplitude and the phase which are identical to the voltage amplitude and the phase of the first full-wave rectified voltage is output from between the second and third terminals.

18. The power supply device according to claim 16, wherein
the switching controller performs soft switching of the first to fourth switching elements by passing the electric current bidirectionally through the first inductor and the second inductor.

19. The power supply device according to claim 16, wherein
a bidirectional and opposite-phase electric current passes through the first inductor and the second inductor, and
when the electric current passing from the first inductor or the second inductor to the second terminal is at a minimum, the switching controller issues an on-command of the first and fourth switching elements or an on-command of the second and third switching elements.

20. The power supply device according to claim 12, further comprising:
m (m is an integer of 2 or more) voltage balance circuits connected to the first to third terminals, wherein
the switching controller controls the m voltage balance circuits,
each of the m voltage balance circuits comprises
the first and second switching elements cascode-connected between the first and third terminals, and
the first inductor connected between a connection node of the first and second switching elements and the second terminal, and
the switching controller applies the electric current bidirectionally to the first inductor in each of the voltage balance circuits to perform soft switching of the first and second switching elements.

* * * * *